United States Patent
Abele et al.

(10) Patent No.: US 12,344,383 B2
(45) Date of Patent: Jul. 1, 2025

(54) AIRCRAFT HAVING AN ENGINE AND A SYSTEM FOR COOLING THE ENGINE

(71) Applicant: Airbus Operations SAS, Toulouse (FR)

(72) Inventors: Antoine Abele, Toulouse (FR); Maxime Zebian, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 918 days.

(21) Appl. No.: 17/512,188

(22) Filed: Oct. 27, 2021

(65) Prior Publication Data

US 2022/0135236 A1     May 5, 2022

(30) Foreign Application Priority Data

Oct. 30, 2020   (FR) ..................... 2011127

(51) Int. Cl.

| | | |
|---|---|---|
| *B64D 13/08* | (2006.01) | |
| *B64D 13/06* | (2006.01) | |
| *B64D 33/08* | (2006.01) | |
| *B64D 37/32* | (2006.01) | |
| *F02C 7/18* | (2006.01) | |
| *F25B 13/00* | (2006.01) | |
| *F25B 31/02* | (2006.01) | |

(52) U.S. Cl.
CPC ............. *B64D 13/08* (2013.01); *B64D 33/08* (2013.01); *B64D 37/32* (2013.01); *F02C 7/18* (2013.01); *F25B 13/00* (2013.01); *F25B 31/026* (2013.01); *B64D 2013/0618* (2013.01); *B64D 2013/0644* (2013.01); *B64D 2013/0648* (2013.01); *B64D 2013/0688* (2013.01)

(58) Field of Classification Search
CPC ........ B64D 13/06; B64D 13/08; B64D 33/08; B64D 2013/0688; F02C 7/12; F02C 7/18
See application file for complete search history.

(56) References Cited

U.S. PATENT DOCUMENTS

| | | | | |
|---|---|---|---|---|
| 4,261,416 A | | 4/1981 | Hamamoto | |
| 5,461,882 A | * | 10/1995 | Zywiak .................. | B64D 13/06 62/401 |
| 9,429,076 B2 | * | 8/2016 | Smith .................... | B64U 20/96 |
| 2010/0288244 A1 | | 11/2010 | Bulin et al. | |
| 2018/0331599 A1 | | 11/2018 | Parlante | |
| 2022/0185485 A1 | * | 6/2022 | Galzin ..................... | F02C 6/08 |

FOREIGN PATENT DOCUMENTS

| | | |
|---|---|---|
| EP | 3401223 A1 | 11/2018 |
| FR | 2923462 A1 | 5/2009 |
| WO | 2020183104 A1 | 9/2020 |

OTHER PUBLICATIONS

French Search Report; priority document.

* cited by examiner

*Primary Examiner* — Allen R. B. Schult
(74) *Attorney, Agent, or Firm* — Greer, Burns & Crain, Ltd.

(57) ABSTRACT

An aircraft having an engine, a cabin, an air conditioning system collecting the hot air from the engine, so as to treat the hot air, regulate a temperature of the hot air and send the hot air towards the cabin via a main line, an air line channeling the air leaving the cabin, and an arrangement for cooling the engine using the air thus drawn off by the air line. By drawing off the air at the outlet of the cabin, the performance of the engine is improved and the fuel consumption is reduced.

10 Claims, 3 Drawing Sheets

AIRCRAFT HAVING AN ENGINE AND A SYSTEM FOR COOLING THE ENGINE

CROSS-REFERENCES TO RELATED APPLICATIONS

This application claims the benefit of the French patent application No. 2011127 filed on Oct. 30, 2020, the entire disclosures of which are incorporated herein by way of reference.

FIELD OF THE INVENTION

The present invention relates to an aircraft having an engine and a system for cooling the engine, and more particularly for cooling various components and compartments of the engine.

BACKGROUND OF THE INVENTION

An aircraft conventionally has a fuselage that delimits a cabin for passengers and the flight crew. In the description, the term "cabin" includes not only the cabin in which the passengers are seated, but also the cockpit.

The aircraft also has at least one engine of the turboprop engine or jet engine type that makes it possible to drive the aircraft.

The aircraft also has an air conditioning system that draws off hot air at the engine, regulates the temperature of the air thus drawn off and sends the air thus regulated towards various parts of the aircraft, including the cabin, so as to regulate the temperature thereof.

The conditioning system thus has heat exchangers, filters, lines, valves etc., and it collects the hot air from the engine, so as to treat it and send it towards its destination, in particular towards the cabin.

FIG. 6 shows a diagram of such an aircraft 600 of the prior art. The aircraft 600 has an engine 502, a cabin 504 and an air conditioning system 506. The air conditioning system 506 is not described further, but it has known means for drawing off the air from the engine, regulating the temperature of this drawn-off air depending on the destination of this air and sending the air thus regulated towards its destination.

The hot air is drawn off for example at the compressor of the engine 502 and it is channeled towards the air conditioning system 506, then, at the outlet of the air conditioning system 506, it joins the cabin 504. The air in the cabin 504 is then ejected towards the outside 52 so as to be renewed.

When passing through the air conditioning system 506, the air is channeled towards heat exchangers where it is cooled by air 50 drawn off for example at a fan duct of the engine 502 and/or a scoop of the fuselage.

In order to manage the temperature of the engine 502, it is known to use an oil circuit 510 that has a reservoir 512, a supply line 514 that channels the oil from the reservoir 512 towards the engine 502 and a return line 516 that channels the oil from the engine 502 towards the reservoir 512. In order to drive the oil in motion, a pump 518 is provided that in this case is on the supply line 514.

In order to cool the oil before it arrives at the engine 502, it is known to use at least one first heat exchanger 520 and at least one second heat exchanger 522 that are arranged along the supply line 514 from the engine 502.

In the first heat exchanger 520, heat is exchanged with drawn-off air that circulates in an air line 526 before being rejected to the outside. The air is drawn off for example from the fan duct of the engine.

In the second heat exchanger 522, heat is exchanged with the fuel that circulates in a fuel line 524 between the fuel reservoir and the combustion chamber of the engine 502.

The engine 502 conventionally has a plurality of compartments 530, including:
a fan compartment that is around the fan, and
a compressor compartment that surrounds the compressor and the combustion zone.

The fan compartment contains various components that give off heat as a result of their operation. These components are then cooled by ventilation of air drawn off by scoops at a nacelle surrounding the engine 502 and/or by oil circulating in the fan compartment.

The compressor compartment also contains components that give off heat as a result of their operation and are subjected to thermal radiation from the engine. These components are then cooled by ventilation of air drawn off by scoops situated in a bypass duct of the engine 502 and/or by oil circulating in the compressor compartment and more generally circulating in the engine.

Each compartment 530 is thus ventilated by a stream of air 532 rejected to the outside.

By drawing off the air from the fan duct so as to cool the oil and ventilate the engine, the performance of the engine is reduced and the fuel consumption is increased.

It is therefore necessary to find an installation that makes it possible to guarantee better performance of the engine and a reduction in the fuel consumption.

SUMMARY OF THE INVENTION

An object of the present invention is to propose an aircraft having an engine and a system for cooling the engine.

To that end, an aircraft is proposed, having:
an engine,
a cabin,
an air conditioning system having means for collecting hot air from the engine, so as to treat it, regulate its temperature and send it towards the cabin via a main line,
an air line channeling the air leaving the cabin, and
means for cooling the engine using the air thus drawn off by the air line.

By drawing off the air at the outlet of the cabin, the performance of the engine is improved and the fuel consumption is reduced.

According to one particular embodiment, the engine has a compartment, and the means for cooling the engine have an extension of the air line that channels the air drawn off from the cabin directly towards the compartment.

Advantageously, the aircraft has a non-return valve disposed on the air line between the compartment and the cabin, wherein the non-return valve prevents the circulation of air from the compartment towards the cabin.

According to one particular embodiment, the means for cooling the engine have:
an oil circuit having an oil reservoir, a supply line that channels the oil from the reservoir towards the engine and a return line that channels the oil from the engine towards the reservoir,
an extension of the air line, and
a first heat exchanger arranged so as to exchange heat between the supply line and the extension of the air line.

According to one particular embodiment, at the outlet of the first heat exchanger, the extension of the air line rejects the air to the outside.

According to one particular embodiment, the engine has a compartment, and, at the outlet of the first heat exchanger, the extension of the air line rejects the air into the compartment.

According to one particular embodiment, the engine has a compartment, and, upstream of the first heat exchanger, the air line has a diversion extension that deviates a part of the stream of air flowing in the air line leaving the cabin towards the compartment.

Advantageously, the aircraft has a non-return valve disposed on the air line between the first heat exchanger and the cabin, wherein the non-return valve prevents the circulation of air from the first heat exchanger towards the cabin.

Advantageously, the aircraft has an additional heat exchanger arranged along the supply line, and a transfer line that collects the air at a fan duct, makes it pass through the additional heat exchanger and rejects it towards the outside, and, upstream of the additional heat exchanger, the transfer line is equipped with a flow rate regulator controlled by the temperature of the oil at the outlet of the first heat exchanger.

Advantageously, the aircraft has a bypass line that is disposed between the main line at the inlet of the cabin and the air line at the outlet of the cabin and the bypass line is equipped with a valve that can be commanded to open and close so as to allow or prevent the flow of the air in the bypass line.

BRIEF DESCRIPTION OF THE DRAWINGS

The abovementioned features of the invention, along with others, will become more clearly apparent upon reading the following description of an exemplary embodiment, the description being given with reference to the appended drawings, in which.

DETAILED DESCRIPTION OF THE PREFERRED EMBODIMENTS

Figure 1:
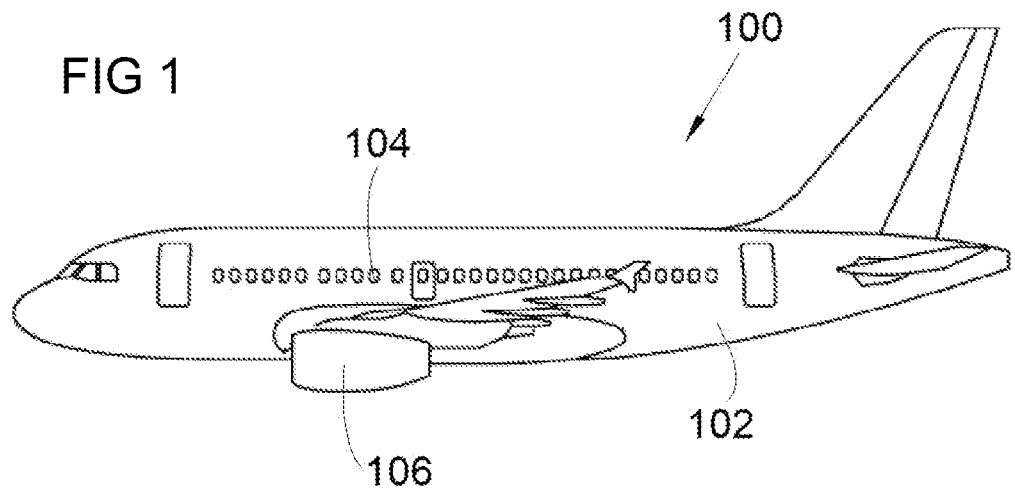
FIG. 1 is a side view of an aircraft according to the invention.

FIG. 1 shows an aircraft 100 that has a fuselage 102 inside which is delimited a cabin 104 including the space where the passengers are seated and the cockpit.

The aircraft 100 also has at least one propulsion system 106 having an engine, in particular a jet engine or a turboprop engine.

FIGS. 2, 3, 4 and 5 show an aircraft 100, 300, 400, 500 according to different variants of the invention. The references that are common to the aircraft 100, 300, 400, 500 according to the invention and to the aircraft 600 of the prior art represent the same elements.

The aircraft 100, 300, 400, 500 thus has an engine 502, a cabin 504 and an air conditioning system 506. As in the case of the prior art, the conditioning system 506 has means for collecting the hot air from the engine 502, in particular from the compressor, so as to treat it and regulate its temperature and send it towards its destination, in particular towards the cabin 504. These means comprise, for example, heat exchangers, filters, lines, valves, etc.

The air collected by the air conditioning system 506 at the engine 502 is cooled at heat exchangers by the air 50 drawn off, for example, at a fan duct of the engine 502 and/or a scoop of the fuselage.

The hot air from the engine 502 thus passes through the air conditioning system 506 and joins the cabin 504 via a main line 203.

The engine 502 has compartments 302 such as for example a fan compartment or a compressor compartment.

The air in the cabin 504 is drawn off from the cabin 504 via an air line 226 that conveys the air thus drawn off towards means for cooling the engine 502, either via ventilation in at least one compartment of the engine 502, or via cooling of the oil circulating in the engine 502.

Thus, by replacing the air drawn off from the fan duct of the engine with the air drawn off at the outlet of the cabin, the performance of the engine is diminished to a lesser extent and the fuel consumption is lower than in the case of the prior art.

The aircraft 100, 300, 400, 500 also has an oil circuit 510 that has an oil reservoir 512, a supply line 514 that channels the oil from the reservoir 512 towards the engine 502 and a return line 516 that channels the oil from the engine 502 towards the reservoir 512. In order to drive the oil in motion, a pump 518 is provided that in this case is on the supply line 514.

In order to cool the oil before it arrives at the engine 502, the aircraft 100, 300, 400, 500 has, from the engine 502, a first heat exchanger 220, where heat is exchanged with air, and a second heat exchanger 522 arranged along the supply line 514 between the first heat exchanger 220 and the reservoir 512. In the second heat exchanger 522, heat is exchanged with the fuel that circulates in a fuel line 524 between the fuel reservoir and the combustion chamber of the engine 502.

As the air coming from the cabin 504 has a lower temperature than the air coming from the fan duct, the cooling of the oil at the first heat exchanger 220 is made easier relative to the prior art, and this first heat exchanger 220 can be smaller than the first heat exchanger 520 of the prior art.

Figure 5:
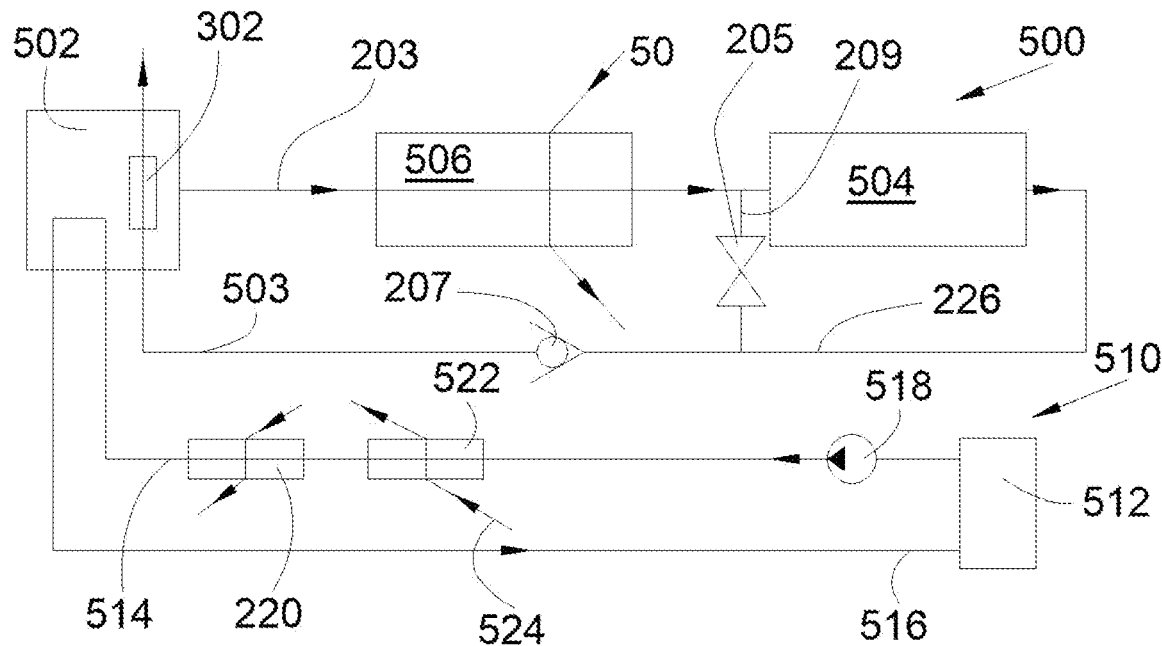
FIG. 5 is a schematic depiction of an aircraft according to a third variant of the invention.
Figure 6:
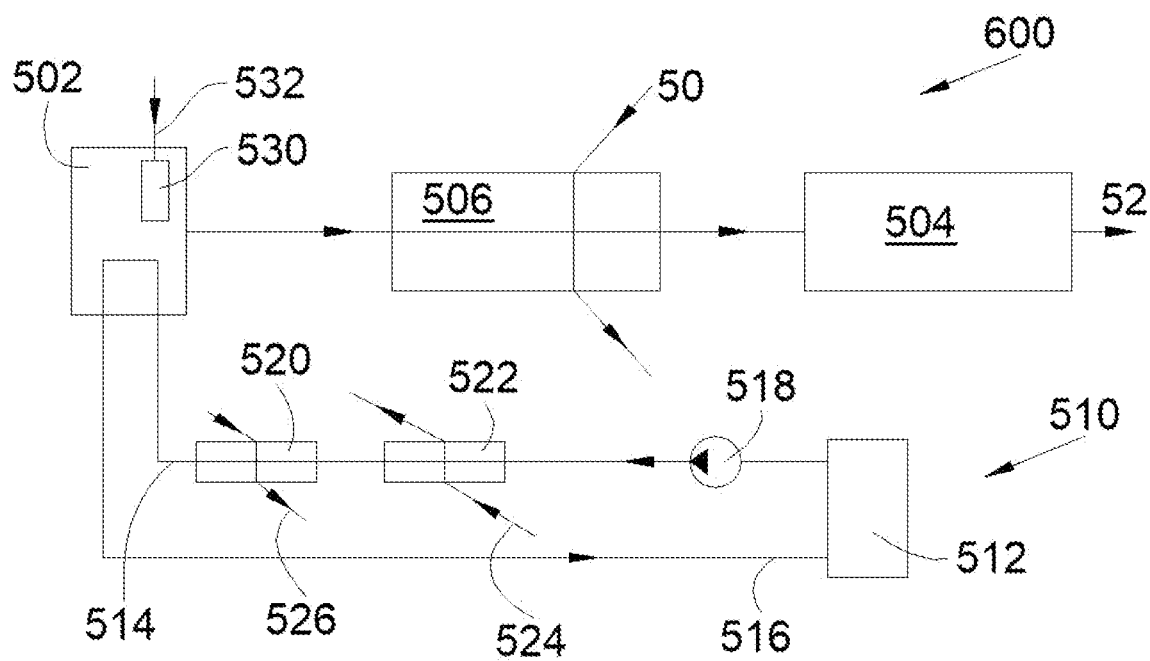
FIG. 6 is a schematic depiction of an aircraft of the prior art.

In the embodiment of the invention in FIG. 5, the air line 226 has an extension 503 that channels the air drawn off from the cabin 504 directly towards at least one of the compartments 302 where it ventilates the compartment 302 and thus participates in cooling the engine 502 before being rejected to the outside.

In this embodiment, the means for cooling the engine 502 are then constituted of the extension 503 of the air line 226.

In order to prevent the air flowing back from the first heat exchanger 220 towards the cabin 504 via the air line 226, a non-return valve 207 is disposed on the air line 226 between the compartment 302 and the cabin 504. The non-return valve 207 prevents the circulation of air from the compartment 302 towards the cabin 504.

In order to prevent the air arriving at the compartment 302 when the cabin 504 is depressurized, a bypass line 209 is disposed on the main line 203 between the outlet of the air conditioning system 506 and the inlet of the cabin 504 and it joins the air line 226 at the outlet of the cabin 504. The bypass line 209 is equipped with a valve 205, such as for example a solenoid valve, which can be commanded to open and close so as to allow or prevent the flow of the air in the bypass line 209.

Figure 2:
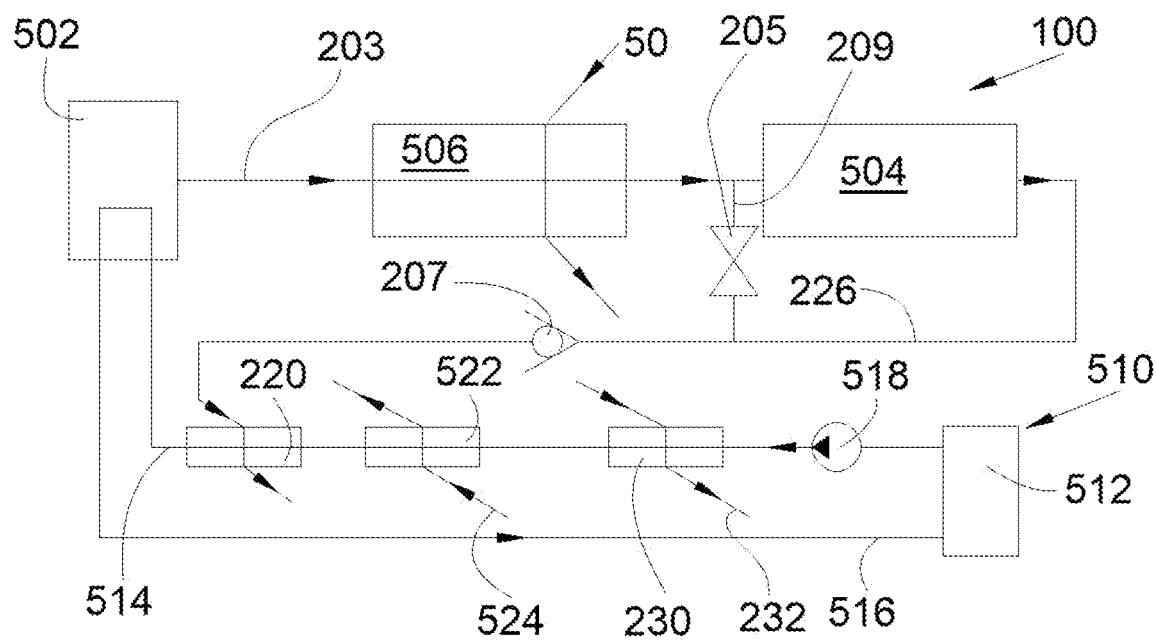
FIG. 2 is a schematic depiction of an aircraft according to the invention.
Figure 3:
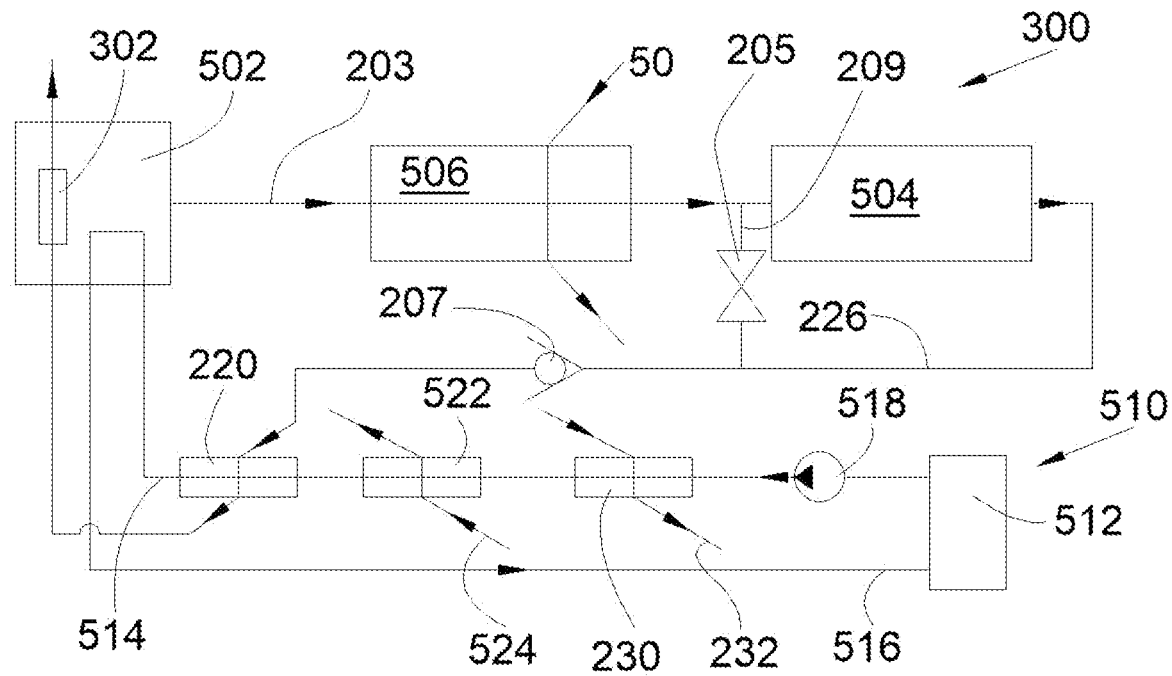
FIG. 3 is a schematic depiction of an aircraft according to a first variant of the invention.
Figure 4:
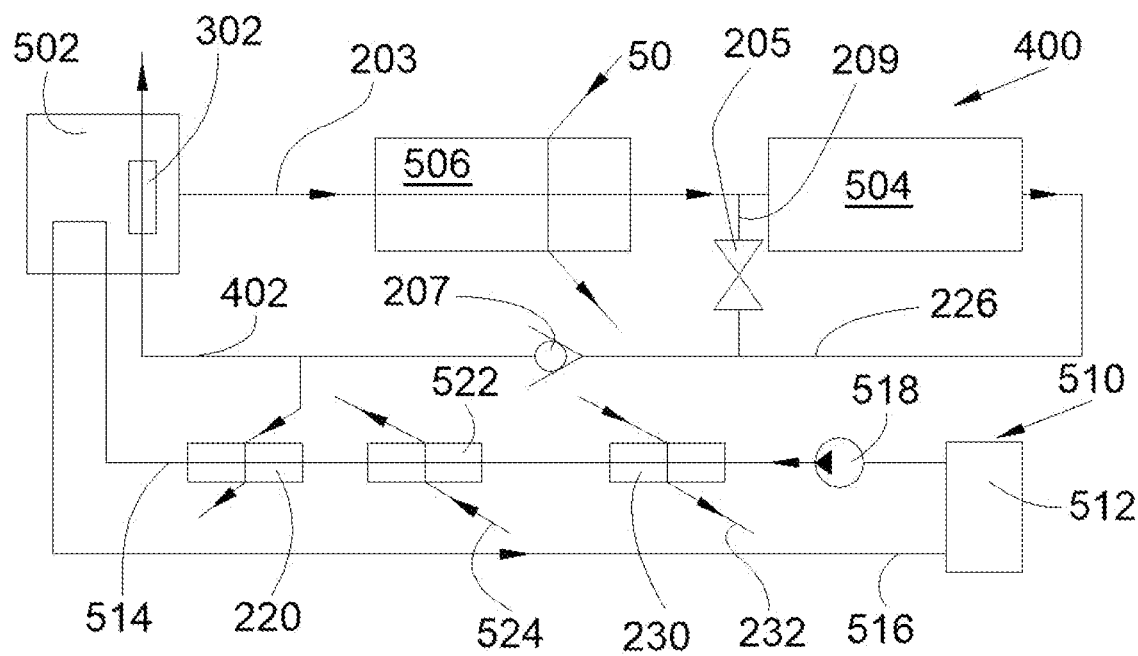
FIG. 4 is a schematic depiction of an aircraft according to a second variant of the invention.

In the embodiments of the invention in FIGS. 2, 3 and 4, the air participating in the heat exchange in the first heat exchanger 220 leaves the cabin 504 via the air line 226 that has an extension that channels the air drawn off from the cabin 504 into the first heat exchanger 220. The first heat exchanger 220 is thus arranged so as to exchange heat between the supply line 514 and the extension of the air line 226.

In these embodiments, the means for cooling the engine 502 are then constituted by the oil circuit 510, the first heat exchanger 220 and the extension of the air line 226 that channels the air drawn off from the cabin 504 into the first heat exchanger 220.

In the embodiment in FIG. 2, at the outlet of the first heat exchanger 220, the extension of the air line 226 rejects the air to the outside.

In the embodiment in FIG. 3, the air leaving the first heat exchanger 220 is channeled by the extension of the air line 226 towards a compartment 302 of the engine 502, such as, for example, the compressor compartment or the fan compartment.

Such an arrangement thus avoids drawing off air from the fan duct, further improving the performance of the engine 502. Thus, at the outlet of the first heat exchanger 220, the extension of the air line 226 rejects the air into the compartment 302 so as to ventilate it and cool the engine 502. At the outlet of the compartment 302, the air is rejected towards the outside.

In the embodiment in FIG. 4, the air line 226 leaving the cabin 504 is divided into two extensions of which one, the main extension, channels the air so as to supply the first heat exchanger 220 and of which the other 402, the secondary and diversion extension, channels the air towards the compartment 302 of the engine 502, such as for example the compressor or fan compartment.

Such an arrangement thus avoids drawing off air from the fan duct, further improving the performance of the engine 502. At the outlet of the compartment 302, the air is rejected towards the outside.

Thus, the aircraft 400 has, upstream of the first heat exchanger 220 with respect to the direction of flow of the air, a diversion extension 402 that deviates a part of the stream of air flowing in the air line 226 leaving the cabin 504 towards the compartment 302.

In the embodiments in FIGS. 2 to 4, the aircraft 100, 300, 400 has an additional heat exchanger 230 arranged along the supply line 514, where heat is exchanged with air drawn off from the fan duct of the engine 502 via a transfer line 232 that collects the air at the fan duct, makes it pass through the additional heat exchanger 230 and rejects it towards the outside. The volume of air drawn off from the fan duct is lower than in the case of the prior art as a result of the presence of the first heat exchanger 220 and therefore makes it possible to have a small heat exchanger. The position of the additional heat exchanger 230 along the supply line 514 can be different.

Furthermore, upstream of the additional heat exchanger 230, the transfer line 232 is equipped with a flow rate regulator controlled by the temperature of the oil at the outlet of the first heat exchanger 220. To this end, at the outlet of the first heat exchanger 220, the supply line 514 is equipped with a temperature measuring device that measures the temperature of the oil and the aircraft 100, 300, 400 has a control unit that is connected to the temperature measuring device and to the flow rate regulator and that, depending on the temperature, will control the flow rate regulator so as to regulate the drawing-off of air from the fan duct as accurately as possible so that the oil reaches a setpoint temperature.

In the embodiments in FIGS. 2 to 4, a non-return valve 207 on the air line 226 between the first heat exchanger 220 and the cabin 504 and a bypass line 209 are also provided.

Although the invention described above is described in the case of an engine beneath a wing, it applies equally regardless of the position of the engine in the aircraft, such as, for example, on the fuselage, in the fuselage or elsewhere.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft having:
   an engine,
   a cabin,
   an air conditioning system having means for collecting hot air from the engine, to treat the hot air, to regulate a temperature of the hot air and send the hot air towards the cabin via a main line,
   an air line channeling air leaving the cabin, and
   means for cooling the engine using the air thus drawn off by the air line,
   wherein the engine has a compartment, and
   wherein the means for cooling the engine have an extension of the air line that channels the air drawn off from the cabin directly towards said compartment,
   wherein said aircraft has a non-return valve disposed on the air line between the compartment and the cabin, and
   wherein the non-return valve prevents a circulation of air from the compartment towards the cabin.

2. The aircraft according to claim 1, wherein the means for cooling the engine have:
   an oil circuit having an oil reservoir, a supply line that channels oil from the reservoir towards the engine and a return line that channels the oil from the engine towards the reservoir,
   an extension of the air line, and
   a first heat exchanger arranged to exchange heat between the supply line and the extension of the air line.

3. The aircraft according to claim 2, wherein, at an outlet of the first heat exchanger, the extension of the air line rejects the air to the outside.

4. The aircraft according to claim 3,
   wherein the engine has a compartment, and
   wherein, at the outlet of the first heat exchanger, the extension of the air line rejects the air into said compartment.

5. The aircraft according to claim 2,
wherein the engine has a compartment, and
wherein, upstream of the first heat exchanger, the air line has a diversion extension that deviates a part of a stream of air flowing in the air line leaving the cabin towards the compartment.

6. The aircraft according to claim 2,
wherein said aircraft has a non-return valve disposed on the air line between the first heat exchanger and the cabin, and
wherein the non-return valve prevents a circulation of air from the first heat exchanger towards the cabin.

7. The aircraft according to claim 2,
wherein said aircraft has an additional heat exchanger arranged along the supply line, and a transfer line that collects the air at a fan duct, makes the collected air pass through the additional heat exchanger and rejects the collected air towards the outside, and
wherein, upstream of the additional heat exchanger, the transfer line is equipped with a flow rate regulator controlled by the temperature of the oil at an outlet of the first heat exchanger.

8. The aircraft according to claim 1,
wherein said aircraft has a bypass line that is disposed between the main line at an inlet of the cabin and the air line at an outlet of the cabin, and
wherein the bypass line is equipped with a valve that can be commanded to open and close so as to allow or prevent a flow of the air in the bypass line.

9. An aircraft having:
an engine,
a cabin,
an air conditioning system having means for collecting hot air from the engine, to treat the hot air, to regulate a temperature of the hot air and send the hot air towards the cabin via a main line,
an air line channeling air leaving the cabin, and
means for cooling the engine using the air thus drawn off by the air line, wherein the means for cooling the engine have:
an oil circuit having an oil reservoir, a supply line that channels oil from the reservoir towards the engine and a return line that channels the oil from the engine towards the reservoir,
an extension of the air line, and
a first heat exchanger arranged to exchange heat between the supply line and the extension of the air line,
wherein, at an outlet of the first heat exchanger, the extension of the air line rejects the air to the outside,
wherein the engine has a compartment, and
wherein, at the outlet of the first heat exchanger, the extension of the air line rejects the air into said compartment.

10. An aircraft having:
an engine,
a cabin,
an air conditioning system having means for collecting hot air from the engine, to treat the hot air, to regulate a temperature of the hot air and send the hot air towards the cabin via a main line,
an air line channeling air leaving the cabin, and
means for cooling the engine using the air thus drawn off by the air line, wherein the means for cooling the engine have:
an oil circuit having an oil reservoir, a supply line that channels oil from the reservoir towards the engine and a return line that channels the oil from the engine towards the reservoir,
an extension of the air line, and
a first heat exchanger arranged to exchange heat between the supply line and the extension of the air line,
wherein said aircraft has an additional heat exchanger arranged along the supply line, and a transfer line that collects the air at a fan duct, makes the collected air pass through the additional heat exchanger and rejects the collected air towards the outside, and
wherein, upstream of the additional heat exchanger, the transfer line is equipped with a flow rate regulator controlled by the temperature of the oil at an outlet of the first heat exchanger.

\* \* \* \* \*